(12) United States Patent
Hensley

(10) Patent No.: US 7,444,959 B2
(45) Date of Patent: Nov. 4, 2008

(54) ANIMAL SELF-GROOMING SYSTEM

(76) Inventor: Roy Austin Hensley, 3817 Grifbrick Dr., Plano, TX (US) 75075-1515

( * ) Notice: Subject to any disclaimer, the term of this patent is extended or adjusted under 35 U.S.C. 154(b) by 336 days.

(21) Appl. No.: 11/205,663

(22) Filed: Aug. 17, 2005

(65) Prior Publication Data

US 2007/0039558 A1  Feb. 22, 2007

(51) Int. Cl.
*A01K 13/00* (2006.01)
(52) U.S. Cl. ...................................... 119/622
(58) Field of Classification Search ............... 119/621, 119/622, 623, 616, 611, 613, 627
See application file for complete search history.

(56) References Cited

U.S. PATENT DOCUMENTS

| | | | |
|---|---|---|---|
| 676,358 A | 6/1901 | Fockens | |
| 1,568,226 A | 1/1926 | Larson | |
| 1,582,144 A | 4/1926 | Pflaum | |
| 2,660,183 A | 11/1953 | Gruering | |
| 2,865,039 A | 12/1958 | Kaye et al. | |
| 2,865,329 A | 12/1958 | Elliot | |
| 2,881,460 A | 4/1959 | Baudouin | |
| 2,976,841 A | 3/1961 | Sheffer | |
| 3,059,259 A | 10/1962 | Peilet et al. | |
| 3,175,537 A * | 3/1965 | Paul | 119/656 |
| 4,177,763 A * | 12/1979 | Cook | 119/706 |
| 4,299,190 A * | 11/1981 | Rhodes | 119/170 |
| 4,301,766 A | 11/1981 | Piccone | |
| 4,926,796 A | 5/1990 | Leopold | |
| 4,938,169 A | 7/1990 | Barmakian | |
| 4,996,946 A | 3/1991 | Olson | |
| 5,176,105 A * | 1/1993 | Madden | 119/622 |
| D336,557 S | 6/1993 | Wade | |
| 5,458,088 A | 10/1995 | Owens | |
| 5,517,945 A | 5/1996 | Udelle | |
| 5,579,720 A | 12/1996 | Udelle et al. | |
| 5,630,378 A * | 5/1997 | Multala | 119/621 |
| D386,839 S | 11/1997 | Jennus | |
| 6,378,462 B1 | 4/2002 | Gaves et al. | |
| 6,513,457 B2 | 2/2003 | Huddleston | |
| 6,619,237 B2 | 9/2003 | Robertson | |
| 6,666,167 B1 * | 12/2003 | Carlson | 119/54 |

* cited by examiner

*Primary Examiner*—Michael R. Mansen
*Assistant Examiner*—Monica L Williams
(74) *Attorney, Agent, or Firm*—Kevin Mark Klughart

(57) ABSTRACT

An animal self-grooming system incorporating a platform supporting horizontally and vertically oriented brushes or combs which is usable by an animal without human intervention is disclosed. The brushes or combs are positioned such that they support walk-by and stationary self-grooming respectively as well as massage. An animal attraction substance may be applied to the brushes or combs for animal self-grooming training. A material that promotes claw exercise may optionally be applied to the vertical and/or horizontal structural components of the disclosed device to incorporate a "scratching post" appliance within the animal self-grooming system context.

11 Claims, 17 Drawing Sheets

*Prior Art*

*Prior Art*

*Prior Art*

*Prior Art*

0700

0800

1000

ANIMAL SELF-GROOMING SYSTEM

CROSS RELATION TO RELATED APPLICATIONS

Not applicapable

PARTIAL WAIVER OF COPYRIGHT

A of the material in this patent application is subject to copyright protection under the copyright laws of the United States and of other countries. As of the first effective filing date of the present application, this material is protected as unpublished material.

However, permission to copy this material is hereby granted to the extent that the copy right owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to grooming devices for animals. The grooming system taught by the present invention is particularly useful in connection with pet cats, although use of the system in connection with other animals is anticipated. The present invention also relates to appliances useful for the enjoyment, grooming, and hygiene of pets and other domesticated animals.

DESCRIPTION OF THE PRIOR ART (0100,0200, 0300,0400,0500)

Overview

The prior art is basically directed to four types of grooming devices: self-grooming, walk-through/portal, man-used/manual devices, and cat scratching posts. These categories are generally illustrated in FIGS. 1-5 (0100, 0200, 0300, 0400, 0500) and will now be discussed in detail.

Self-Grooming Prior Art (0100, 0200)

One of these device types facilitates "self-grooming" of an animal. "Self-grooming" devices, of which the present invention is a member, are employed by the animal purely for self-pleasure or grooming and do not need to be inserted into paths such as to food, other spaces, or to a litter box. They are designed such that the animal is compelled to make use of them for the direct pursuit of self-pleasure, massage, or grooming.

FIG. 1 (0100) illustrates prior art "Self-grooming" devices from U.S. Pat. No. 5,517,945 (0101) and U.S. Pat. No. 6,378,462, respectively (0102). FIG. 1 (0101) employs an electric motor to rotate a concave cylindrical brush. The device is bulky, consumes power which may require battery maintenance, and is generally expensive to produce. The shape and positioning of the brush also limit the device's ability to enable grooming of all regions of the pet's body.

FIG. 1 (0102) is an "activity center" for cats that includes various stations for grooming and massaging the animal. The grooming implements are oriented horizontally and reside in trays. Furthermore, not all areas of the animal's body can be self-groomed with the device. The pet has to recline on the device or lower itself in an unnatural posture to make use of the device. As with FIG. 1 (0101), the device is more complex than required, which adds to its overall manufacturing cost.

FIG. 2 (0201, 0202, 0203, 0204) illustrate prior art "Self-grooming" devices from U.S. Pat. No. 4,926,796. The preferred embodiment, shown in FIG. 2 (0201), is comprised of a toothed plate securable to a wall, corner or other supporting fixture. Furthermore, an aperture plate having holes positioned to correspond to the location of the teeth on the toothed plate mesh with the teeth covering a portion of each tooth for providing added strength to and stiffening of each tooth when closed, and a teeth straightening function upon opening and closing the two plates and a teeth cleaning function upon opening of the plates. And finally, a container for holding an animal attracting material is provided, though this is an unnecessary complication.

The device shown in FIG. 2 (0201) has a number of additional deficiencies, however. The grooming surfaces provided are very limited in use since they are only vertically oriented and they cannot fully groom an animal as it may otherwise choose. The teeth are not long enough to completely penetrate an even modest coat of fur or retain significant amounts of shed grooming waste or dirt. The device also has a fixed location as it is adhered to a supporting surface, disallowing relocation to account for changes in animal habits, furniture movement, and the like. And last but not least, the wall or other supporting fixture is likely to be damaged by the mounting adhesives and, over time, by bodily oils, saliva, and dirt emitted by the animal during use.

The variant shown in FIG. 2 (0202) is free-standing so that it can be relocated, but it shares many of the deficiencies of FIG. 2 (0201). In addition to inadequate grooming flexibility and waste retention capabilities, the base as shown in the patent is unstable such that this embodiment would not be functional in practical use.

FIG. 2 (0203) shows a variation on FIG. 2 (0202) in which the grooming surface is a hollow, vertical cylinder. This embodiment shares all of the same deficiencies that were enumerated for FIG. 2 (0202). FIG. 2 (0204) shows the base detached from FIG. 2 (0203) and the remaining hollow, vertical cylinder placed around a chair leg. While this arrangement provides stability, the fact that there is no firm attachment to the chair leg or other supporting structure enables the cylinder to spin freely which renders grooming utility ineffective. This embodiment otherwise has all of the deficiencies possessed by FIG. 2 (0203).

Walk-Through/Portal Prior Art (0300)

The second type of grooming device used by animals is related to the "self-grooming" type and may be identified as "walk-through" or "portal" devices. These are devices that the animal may walk or crawl through and rake or itself and/or scratch itself during walk-through process. These "portal" devices differ fundamentally from "self-grooming" devices as described above in that the act of grooming occurs with "portal" devices as the animal is attempting to accomplish something else, rather than with the animal's direct pursuit of self-grooming or self-pleasure.

The "portal" animal use devices, although useful in the grooming of the coat of a animal, are generally bulky and unattractive, and often need to be adjusted to fit the animal which is going to use the device, especially when a "portal" animal use device is used in geographic areas which have extremes in weather conditions and the coat of the animal that is going to use the device thickens and/or thins with the changes in seasonal temperatures. Examples of these "portal" or "walk-through" animal use devices are found in U.S. Pat. Nos. 1,568,226, 1,582,144, 2,865,329, 2,976,841, 4,301,766, 4,938,169, 5,458,088, and 5,579,720.

FIG. 3 (0301, 0302) illustrate a prior art "portal" or "walk-through" animal use device from U.S. Pat. No. 4,938,169. Similarly, FIG. 3 (0303) illustrates another prior art "walk-through" device as presented by U.S. Pat. No. 5,458,088. FIG. 3 (0304, 0305, 0306) illustrate additional prior art "walk-through" animal use devices as shown in U.S. Pat. No. 5,579,720. These can require modification of a door, as in FIG. 3 (0302) and FIG. 3 (0303), which does permanent damage to property and makes them inherently immobile. Additional shortcomings, shared by FIG. 3 (0304,0305,0306), include the facts that these devices do not provide full coverage grooming capabilities for the pet, and that felines in particular dislike closed, confining areas and spaces such as those presented by "walk-through" devices. It is therefore implied that these devices are not used by the animal that are purportedly served, rather they become part of the environment and the environment then uses itself on the animal.

Man-Used/Manual Prior Art (0400)

The third type of grooming device used on animals may be identified as "man-used" or "manual" devices. The "manual" devices generally include grooming or cleaning devices such as brushes or combs and are used on animals by humans for grooming and/or cleaning purposes. "Manual" devices, such as brushes, combs and curry-combs are extremely useful in final grooming, but time and attention are required by a person to use these devices on animals as these devices can not be left for use by the animal itself. Examples of devices used by humans on animals may be found in U.S. Pat. Nos. 676,358, 2,660,183, 2,865,039, 2,881,460, 3,059,259, and 6,513,457. FIG. 4 (0400) illustrates a prior art "man-used" or "manual" device as presented by U.S. Pat. No. 6,513,457.

Cat Scratching Post Prior Art (0500)

Prior art also addresses "cat scratching posts" or "cat scratching devices." These are devices that are designed to provide claw sharpening and claw extraction capabilities for pet cats, while being more compelling to the animal for use than household furniture. FIG. 5 (0500) illustrates prior art "cat scratching posts" from U.S. Pat. No. D336,557 (0501), U.S. Pat. No. D386,839 (0502), U.S. Pat. No. 4,177,763 (0503, 0504), U.S. Pat. No. 6,619,237 (0505), and U.S. Pat. No. 4,996,946 (0506), respectively.

The device shown in FIG. 5 (0501) is a common stratching post with an ornamental attachment on the top. While this gives the device some decorative appeal, it is not as attractive as a device that has furniture-like attributes. FIG. 5 (0502) simply modifies the normal scratching post covering such that the carpet is inside out. This is unconventional and undesirable however, because claws can more easily become stuck in the mesh carpet backing than in the carpet fibers themselves, which can lead to painful accidental claw extractions.

FIG. 5 (0503, 0504) present a cat scratching post design with a detachable post and a folding base to make for efficient packaging, but it otherwise shares attributes with common scratching posts. FIG. 5 (0506) is a portable "rubbing pedestal" that includes a generally flat base member which extends an upwardly reaching pedestal. The base includes a platform on which is secured a covering into which a cat can sink its claws. The upwardly reaching pedestal provides a flat surface on which is secured a covering into which a cat can sink its claws, and a second surface that is undulated vertically from the base member and is ribbed or corrugated to provide an uneven surface against which a cat can rub its body to provide a self-administered massage.

The function of FIG. 5 (0506) is therefore primarily a scratching post. But while it has an "undulated" surface for rubbing, this does not serve the purpose of grooming or scratching the animal. Furthermore, the undulated feature is placed in a generally unusable location on the device and structural corners could serve a similar function more efficiently and simply with proper design.

Referring now to the collective of cat scratching posts, FIG. 5 (0501, 0502, 0503, 0504, 0505, 0506), the prior art shows a key deficiency. They have no grooming capabilities.

The prior art has yet to address the above detailed deficiencies in existing animal grooming configurations.

OBJECTIVES OF THE INVENTION

Accordingly, the objectives of the present invention are (among others) to circumvent the deficiencies in the prior art and affect the following objectives:
(1) Provide an animal self-grooming and self-pleasuring system and means for voluntary use by an animal without the need for human intervention, and with which the animal is not required to pass through supportive structure.
(2) Provide a grooming system and means that has high grooming waste retention capabilities for use by an animal, and that is easy to clean.
(3) Provide a self-use animal grooming and pleasuring system and means that includes both vertical and horizontal planar grooming areas or surfaces which are positioned for ease of use by the animal.
(4) Provide an animal grooming system and means for use by the animal which is free-standing and aesthetically designed such that it may be placed virtually anywhere within the home or office.
(5) Provide an animal self-grooming system and means that may also be partially covered with appropriate carpeting material, or other appropriate material, that is conducive to causing the cat, or other household pet, to scratch the post and the base.
(6) Provide an animal self-grooming system and means that has fur and dander retention capabilities for the purposes of concentrating the results of shedding and mitigating human exposure to those allergy stimulating elements.
(7) Provide a system and means for animals to groom themselves without human intervention;
(8) Provide a system and means for animals to pleasure themselves through scratching, rubbing, massaging, or petting without human intervention or coaxing;
(9) Provide a system and means for animal grooming and pleasure that allows complete penetration of the animal's fur coat;
(10) Provide a system and means for animal grooming and pleasure that is free-standing;

(11) Provide a system and means for animal grooming and pleasure that incorporates a scratching post to save space and increase utility;

(12) Provide a system and means for animal grooming and pleasure that is aesthetically pleasing to humans in the form of room decoration;

(13) Provide a system and means for animal grooming and pleasure that is transportable to the pet's favorite places as habits change;

(14) Provide a system and means for animal grooming and pleasure that is does not expose walls to animal saliva, skin oils, and dirt;

(15) Provide a system and means for animal grooming and pleasure that retains hair and dirt such that it is not dispersed about the home;

(16) Provide a system and means for animal grooming and pleasure that is easily cleaned and maintained;

(17) Provide a system and means for animal grooming and pleasure that is non-toxic to animals;

(18) Provide a system and means for animal grooming and pleasure that enables easy animal training;

(19) Provide a system and means for animal grooming and pleasure that can address any portion of the animals sides, head, neck, and mouth;

(20) Provide a system and means for animal grooming and pleasure that can aid in the animal's dental maintenance;

(21) Provide a system and means for animal grooming and pleasure that reduces "hair-ball" problems;

(22) Provide a system and means for animal grooming and pleasure that does not impose itself between the animal and another destination such as to food, water, or a litter box.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Overview (0600)

The present invention can be summarized by inspection of FIG. 6 (0600) which details a presently preferred embodiment of the present invention incorporating the following structural elements:

(a) A substantially flat platform (0601);
(b) A vertical supporting member (0602) attached substantially perpendicular to the platform (0601);
(c) A horizontal supporting member (0604) attached substantially perpendicular to the vertical supporting member (0602);
(d) A vertical grooming brush (0603) attached to the vertical supporting member (0602);
(e) A horizontal grooming brush (0605) attached to the horizontal supporting member (0604);
wherein
the vertical grooming brush (0603) is attached substantially parallel to the vertical supporting member (0602) and is attached on the opposite side of the vertical supporting member (0602) from the attachment point of the horizontal supporting member (0603) to the vertical supporting member (0602);

the horizontal grooming brush (0605) is attached to the horizontal supporting member (0604) with the brush fibers of the horizontal grooming brush (0605) generally upwardly facing.

Within the above context, the term "substantially perpendicular" is defined to mean "within ±45 degrees of perpendicular" and the term "substantially parallel" is defined to mean "within ±45 degrees of parallel." This general structure will now be discussed in further detail.

Presently Preferred Exemplary Embodiment

The present invention is an animal use "self-grooming" and "self-pleasure" device that is adapted to be used by the animal voluntarily and with intent on any part of its body, that avoids the need for the adjustments that are associated with animal "walk-through" devices, and that offers more flexibility in use than other "self-grooming" devices. The present invention is a free-standing animal grooming and animal pleasuring device primarily useful in the home by house pets such as cats, wherein the device may be placed in the animal's favorite rest and relaxation spot. As such, the device is designed with visual appeal such that it does not look out of place or undermine the quality of a room's decor.

As a device to be used by the animal or pet itself, the need of human attention as required by manually used or "man used" brushes or combs for grooming the animal is reduced or not required. In addition since the present invention is for use by the animal, the animal may take advantage of using the device whenever it wishes and without human intervention, which is important with the frequent confinement and solitude modern pets are subjected to. Of particular importance here is the fact that this invention has large grooming surfaces and multiple orientations that allow the animal to self-groom, scratch, pet, or massage virtually any part of its body, and that allow the animal to do so in natural postures or positions. The bristles can also be comprised of natural, non-toxic substances such that they are not hazardous to animals using the device to clean their teeth. Thus, the present invention has several advantages over the prior art.

Generally, the present invention is comprised of a base (0601) that supports one or more vertical posts (0602), which in turn support a horizontal arm (0604). The vertical column (0602) and horizontal arm (0604) have brushes (0603, 0605) attached to them such that the brush bristles are generally parallel to and perpendicular to the floor, respectively. However, the present invention does not limit the scope of brush bristle orientation, and anticipates other orientations in some configurations.

When the present self-use grooming device is employed by an animal, the animal rubs or scratches itself on the bristles or comb teeth, thus grooming its coat, scratching it, or cleaning its teeth. The grooming causes hair and dirt from the animal's coat to become dislodged or freed such that less grooming by humans or self-licking or is required. The former minimizes the time and effort required in pet care, while the later reduces the ingestion of such freed items and in turn reduces the potential for hair balls and the vomiting that can result. The bristles of the brush and comb teeth are designed such that they retain the freed hair and are easily cleaned.

For additional versatility, portions of the device may be covered with appropriate carpeting material (or carpet covering as generally illustrated in FIG. 16 (1600)), or other appropriate material, which is conducive to causing the cat (or other household pet) to scratch the post and/or the base. The combination of a self-grooming device and a scratching appliance has not been presented in the prior art, and it brings functional and economic efficiencies to consumers.

It is instructive to also note that cats, for example, have favorite areas in which to spend leisure time. The present animal self-grooming device should generally be deployed in such "favorite spots" so as to provide a more favorable grooming environment for the pet and in order to keep the particular "favorite spot" of the cat clean. Placement should generally be away from food, water, and waste areas as "favorite spots" tend to be near windows, doors, or areas in which people do or do not congregate. This is particularly important for the use of this invention and unlike U.S. Pat. Nos. 4,807,569 and 4,926,796 which employ strong adhesives to attach combs to a wall or furniture, the present invention may be easily relocated to track changes in the pet's habits and preferences, and the present invention also does not expose walls and furniture to pet bodily oils, dirt, and saliva.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
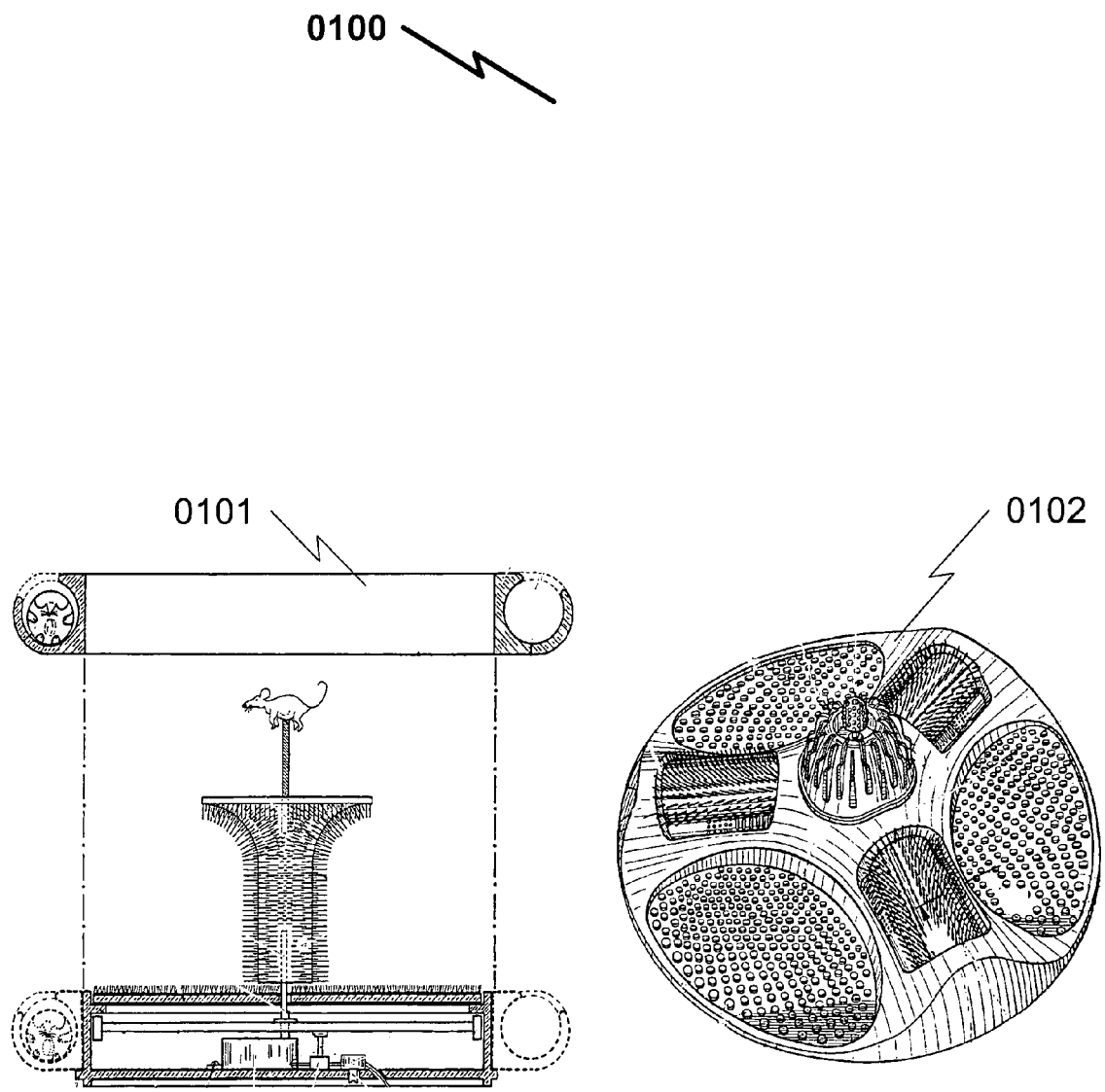
FIG. 1 illustrates a prior art combined mechanically assisted animal amusement, grooming, and claw scratching, or SELF-USE GROOMING DEVICE, from U.S. Pat. No. 5,517,945 (0101); and a prior art cat massaging and grooming device, or SELF-USE GROOMING DEVICE, from U.S. Pat. No. 6,378,462 (0102)
Figure 2:
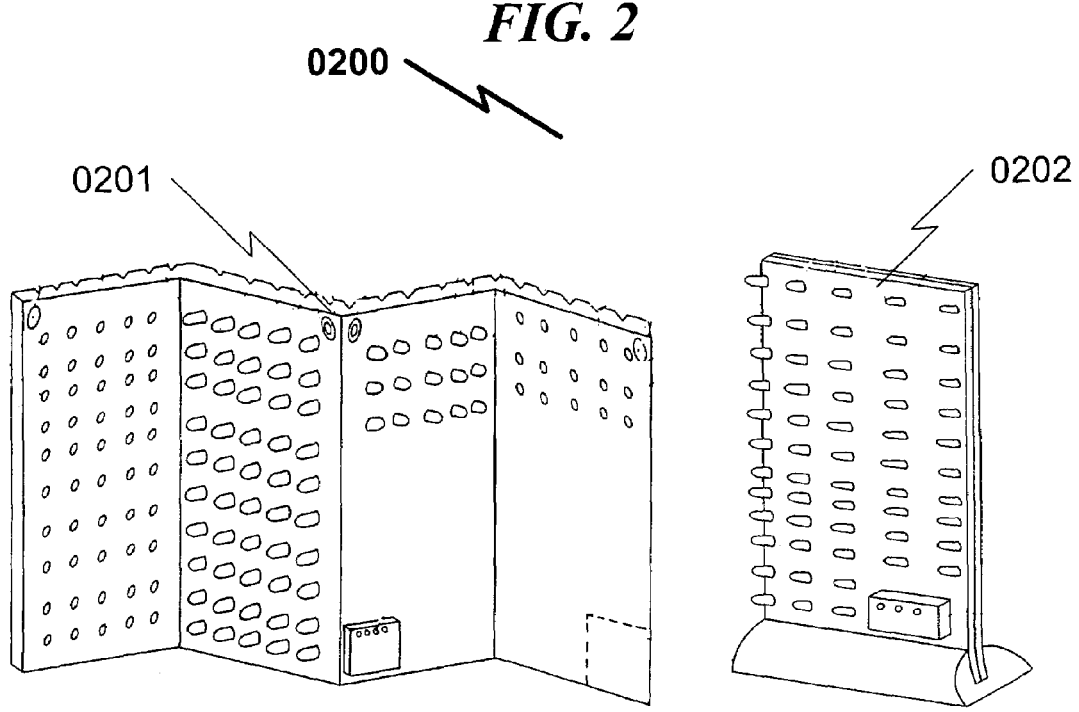
FIG. 2 illustrates a prior art wall-mounted SELF-USE GROOMING DEVICE from U.S. Pat. No. 4,926,796 (0201); a prior art free-standing plane SELF-USE GROOMING DEVICE from U.S. Pat. No. 4,926,796 (0202); a prior art free-standing cylinder SELF-USE GROOMING DEVICE from U.S. Pat. No. 4,926,796 (0203); and a prior art furniture-mounted SELF-USE GROOMING DEVICE from U.S. Pat. No. 4,926,796 (0204)
Figure 2:
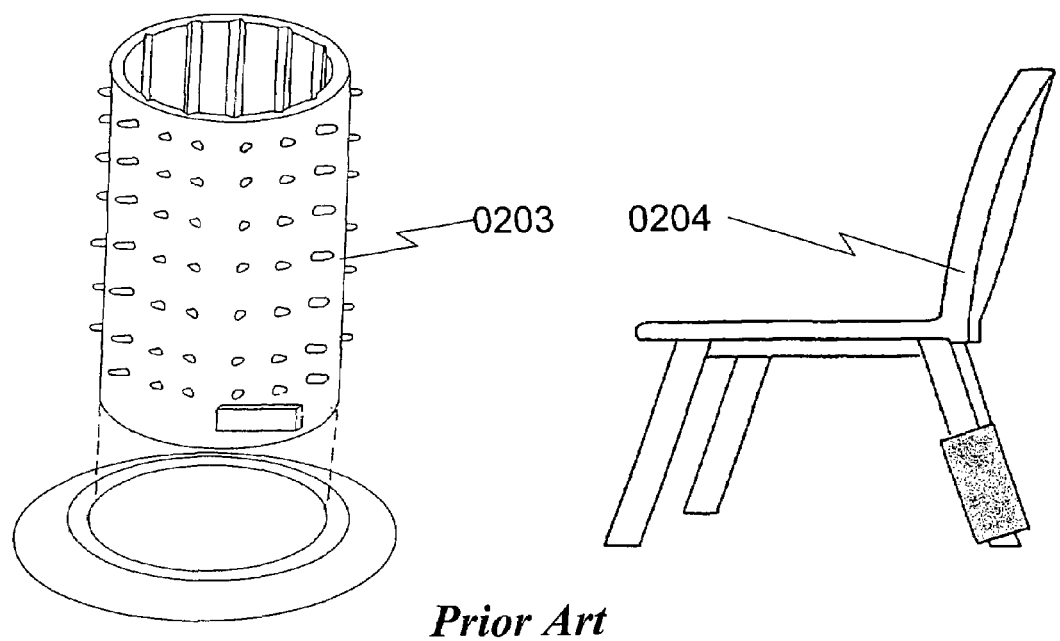
Figure 3:
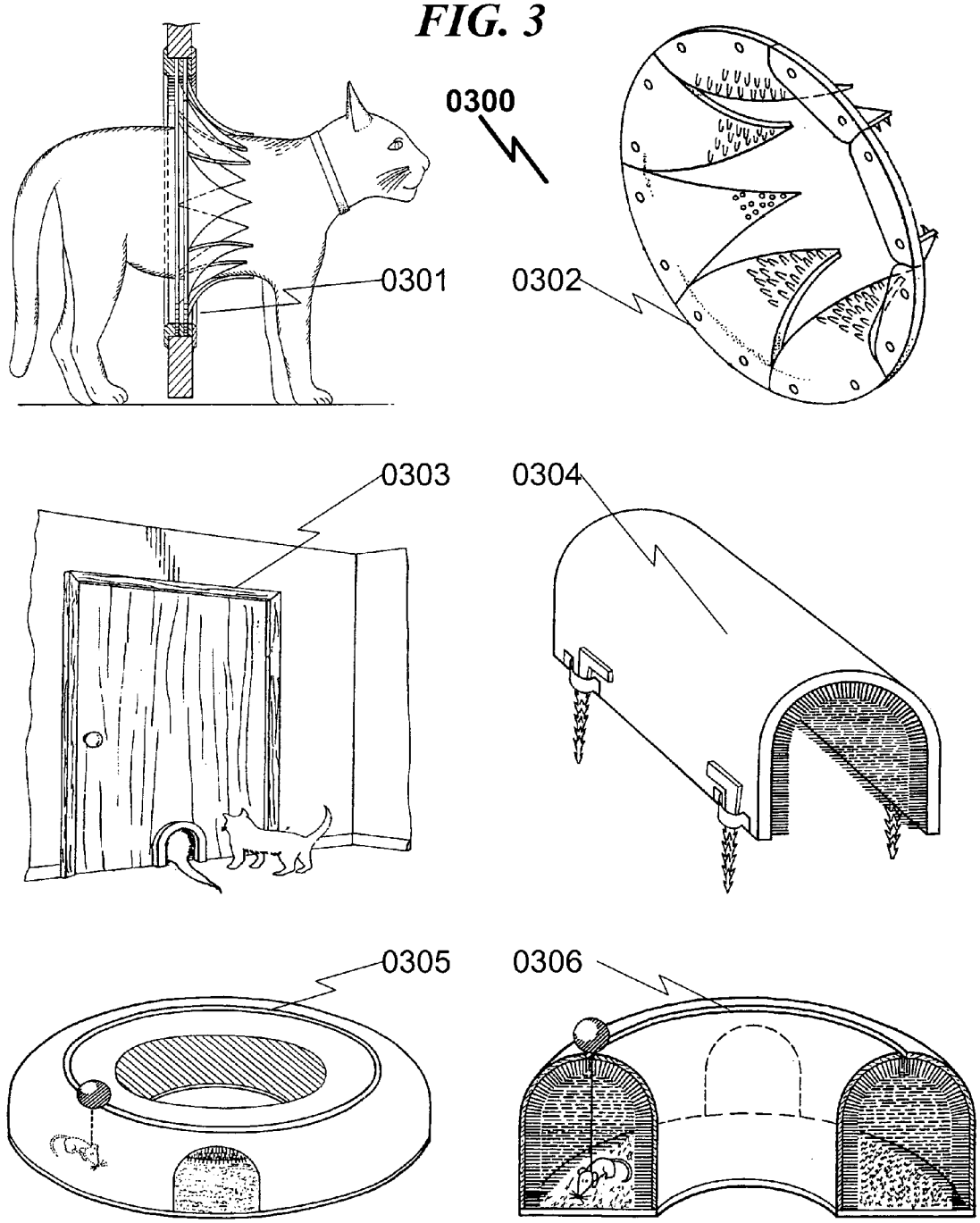
FIG. 3 illustrates a prior art combing gate WALK-THROUGH GROOMING DEVICE from U.S. Pat. No. 4,938,169 (0301, 0302); a prior art brushing archway WALK-THROUGH GROOMING DEVICE from U.S. Pat. No. 5,458,088 (0303); a prior art brushing tunnel WALK-THROUGH GROOMING DEVICE from U.S. Pat. No. 5,579,720 (0304); and perspective and cross-sectional views of a prior art donut WALK-THROUGH GROOMING DEVICE from U.S. Pat. No. 5,579,720 (0305, 0306)
Figure 4:
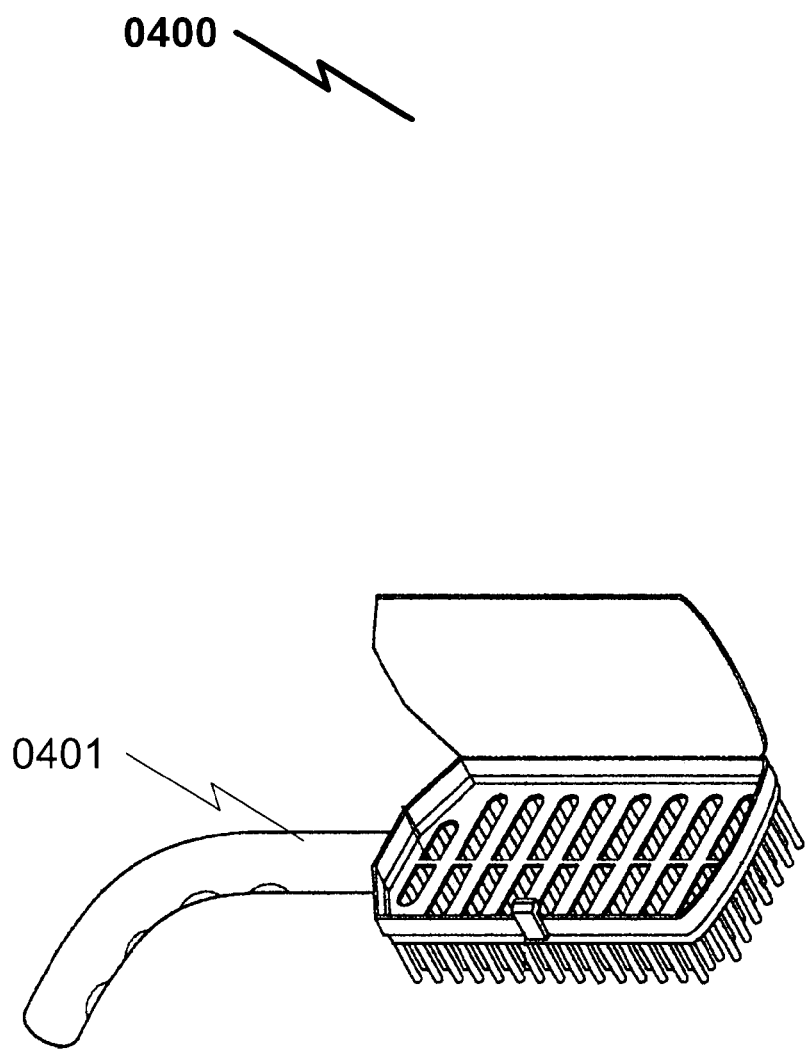
FIG. 4 illustrates a prior art MANUAL-USE GROOMING DEVICE from U.S. Pat. No. 6,513,457 (0401)
Figure 5:
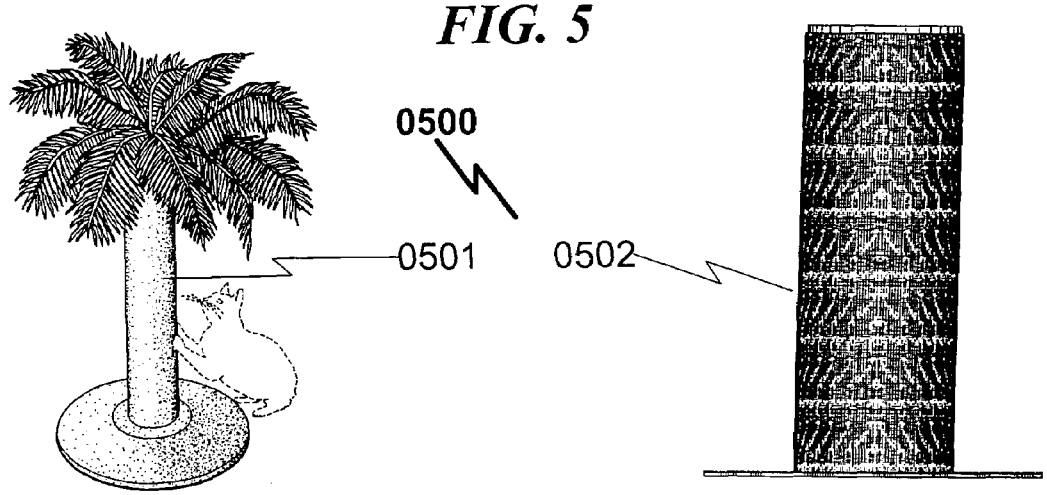
FIG. 5 illustrates a prior art CAT SCRATCHING POST from U.S. Design Pat. No. D336,557 (0501); a prior art CAT SCRATCHING POST COVERED WITH THE BACKSIDE OF CARPETING from U.S. Design Pat. 386,839 (0502); a prior art CAT SCRATCHING POST ASSEMBLY from U.S. Utility Pat. No. 4,177,763 (0503); a prior art CAT SCRATCHING POST ASSEMBLY from U.S. Utility Pat. No. 4,177,763 (0504); a prior art RECOVERABLE CAT-SCRATCHING POST from U.S. Utility Pat. No. 6,619,237 (0505); and a prior art CAT-SCRATCHING AND RUBBING POST from U.S. Utility Pat. No. 4,996,946 (0506)
Figure 5:
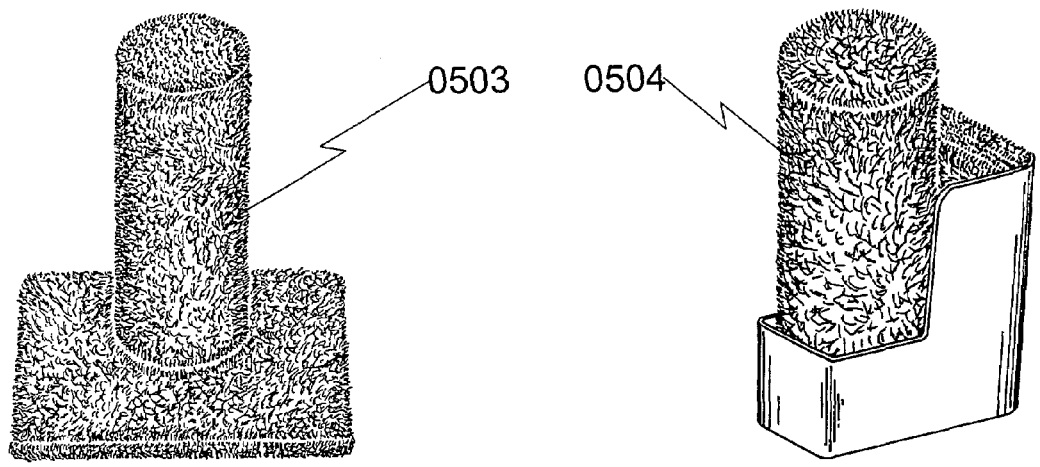
Figure 5:
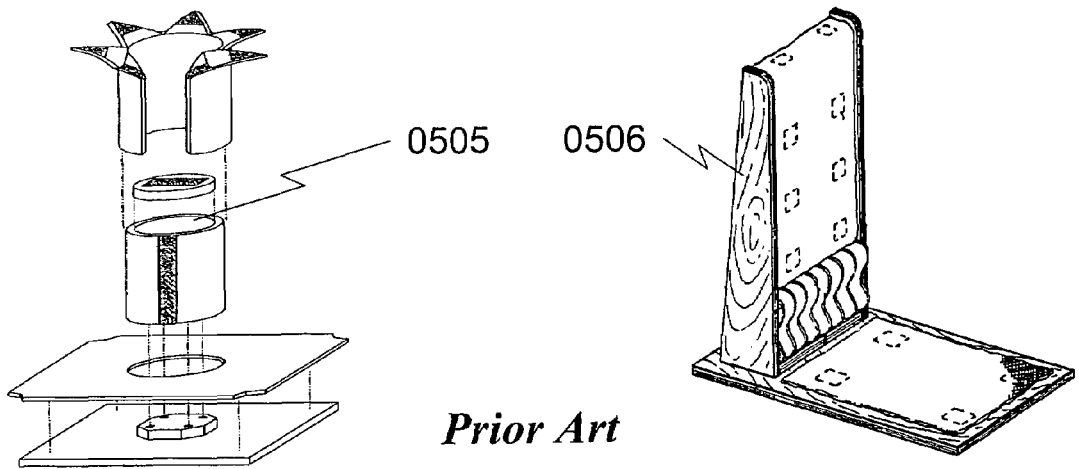

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an ANIMAL SELF-GROOMING SYSTEM. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Animal Not Limitive

The present invention may have particular applicability to self-grooming by feline animals such as domesticated house cats, but the teachings of the present invention are not limited by this particular animal type. Therefore, it is specifically anticipated that the present invention may be generally applied to a wide variety of animal types, and not specifically limited to that of cats.

One skilled in the art will recognize that appropriate sizing and construction details associated with an alternate target animal population will be easily determined from the teachings of the present invention and the specific requirements of the target animal population.

Materials Not Limitive

Figure 9:
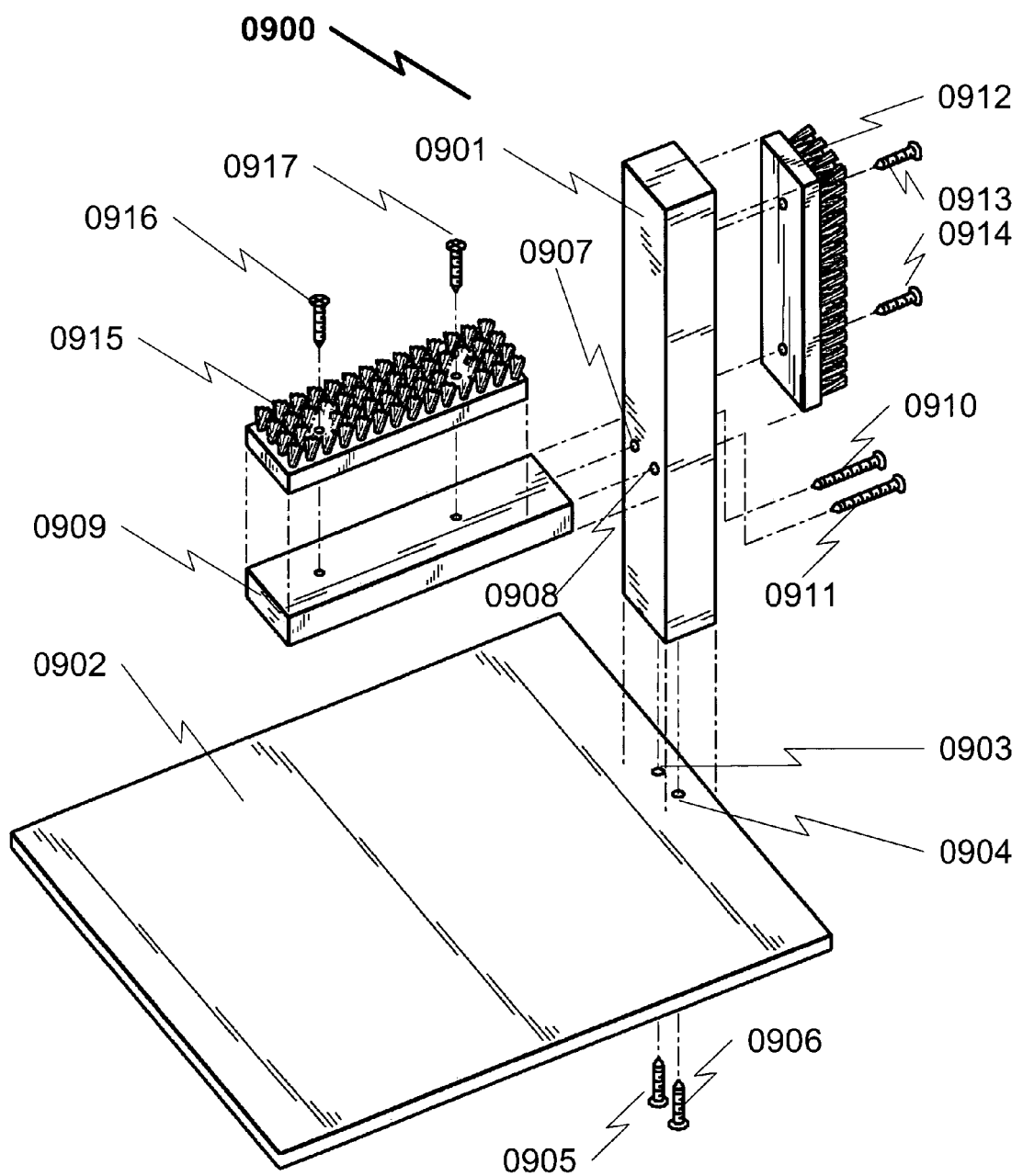
FIG. 9 illustrates a perspective assembly view of a presently preferred exemplary embodiment of the present invention.
Figure 10:
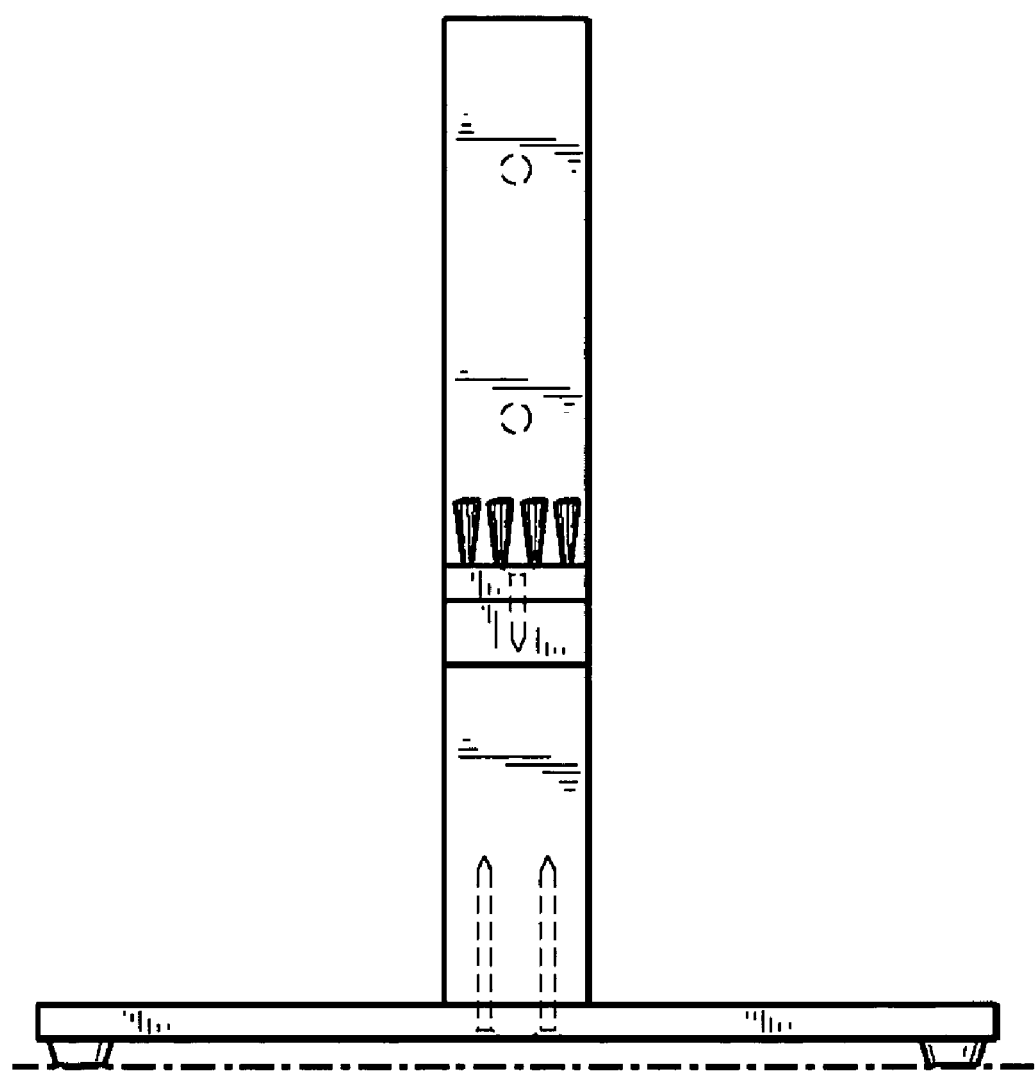
FIG. 10 illustrates a side view of a presently preferred exemplary embodiment of the present invention with end-view detail of the horizontal grooming brush.
Figure 11:
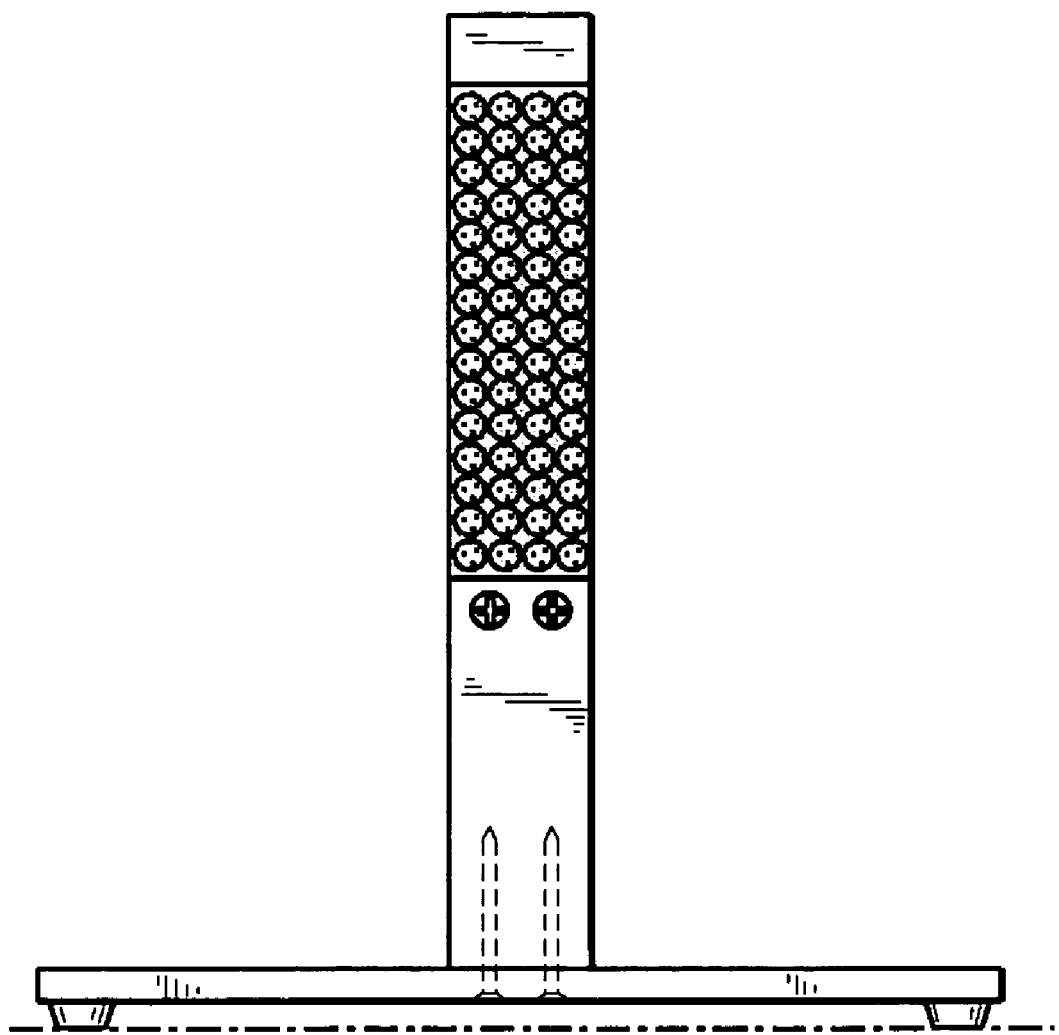
FIG. 11 illustrates a side view of a presently preferred exemplary embodiment of the present invention with detail of the vertical grooming brush.
Figure 12:
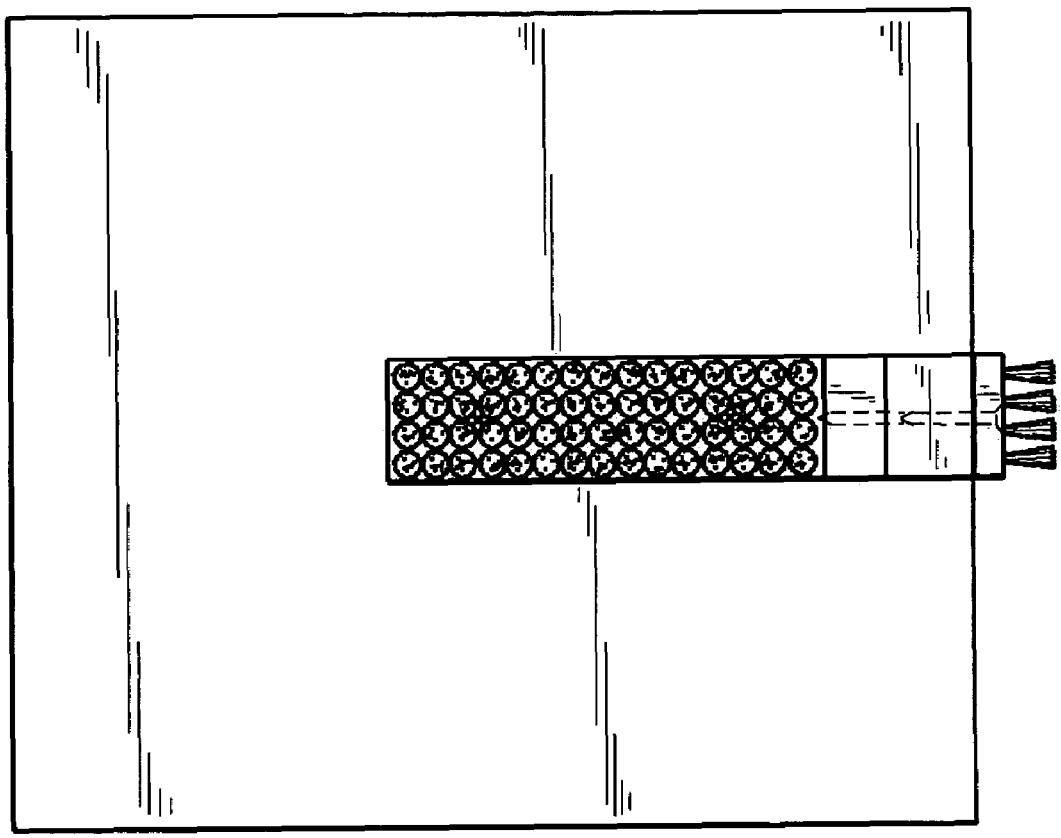
FIG. 12 illustrates a top view of a presently preferred exemplary embodiment of the present invention with top view detail of the horizontal grooming brush.

The exemplary embodiments illustrated herein may be advantageously constructed of wood or other listed materials, but the construction is not limited to these materials. Additionally, the construction as illustrated in FIG. 9 (0900) may be advantageously constructed of a unitary plastic structure (such as created by plastic injection molding) wherein the base, vertical support, and/or horizontal support members are constructed and connected in one plastic injection molding process. One skilled in the art will recognize that a variety of materials may be suitable for use in the construction of the present invention with no loss in the teachings therein.

Carpet Covering Not Limitive

Figure 16:
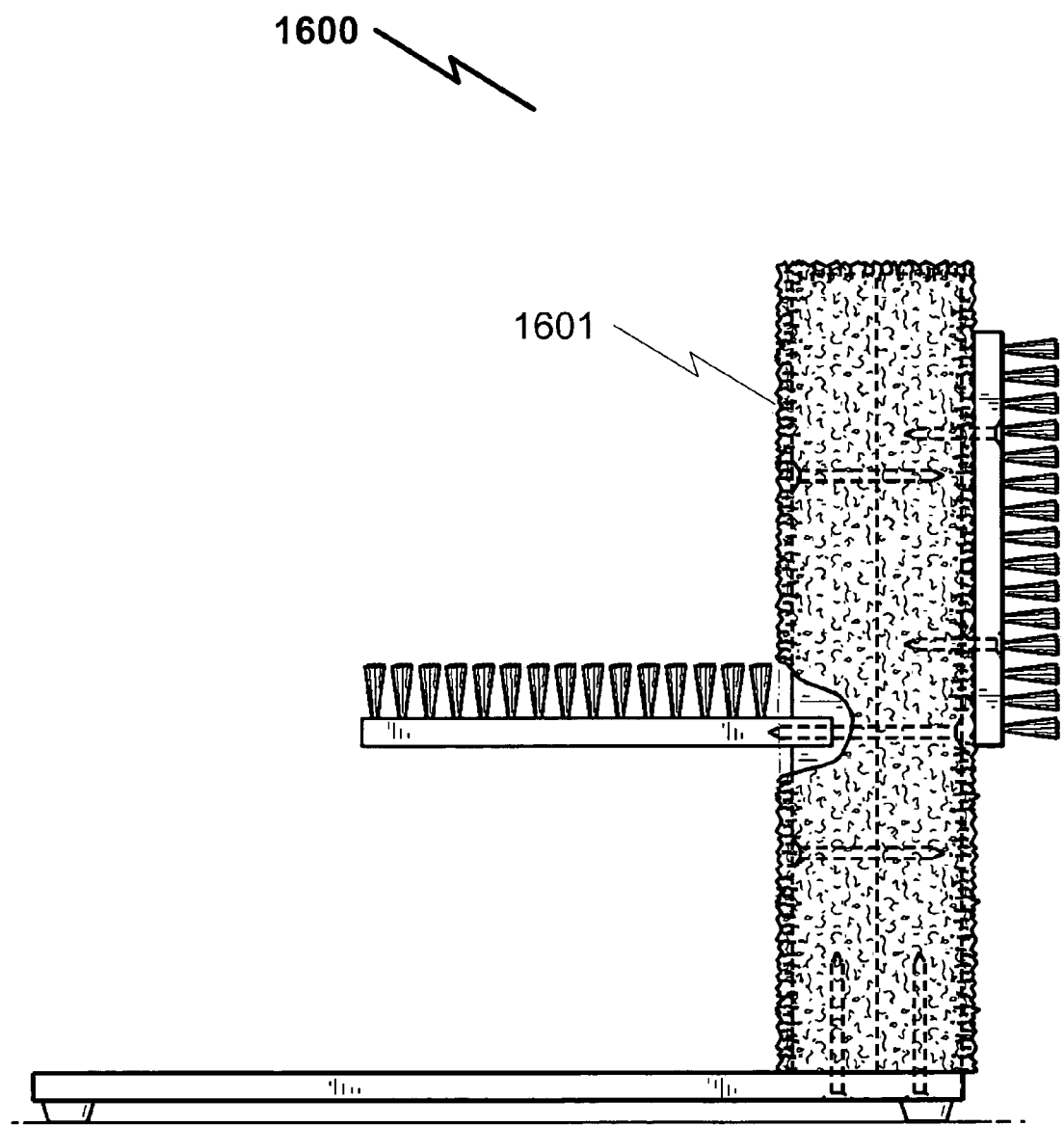
FIG. 16 illustrates a perspective view of a presently preferred exemplary embodiment of the present invention illustrating an alternate construction methodology incorporating an integrated cat scratching pole.
Figure 17:
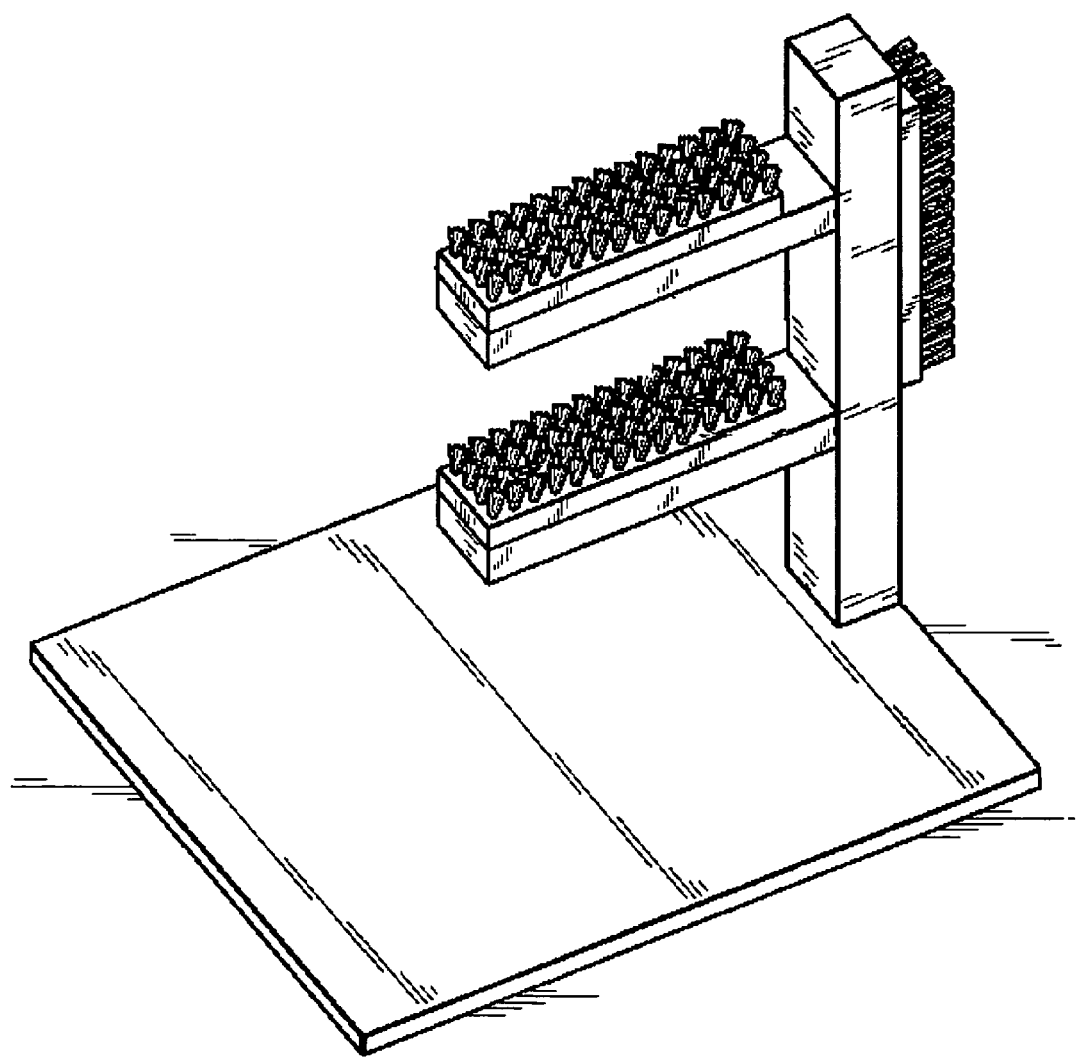

The covering employed in exemplary embodiments illustrated herein for the purposes of integrating "cat scratching post" functionality may be advantageously constructed of carpet, cardboard, fabric, loose fibers, pieces of rope or string, burlap or other listed materials, but the construction is not limited to these materials. Additionally, the construction as illustrated in FIG. 16 (1600) may be advantageously constructed of a unitary plastic structure (such as created by plastic injection molding) wherein the base, vertical support, and/or horizontal support members are constructed and connected, and where carpet fibers or the like may also be embedded in one plastic injection molding process. One skilled in the art will recognize that a variety of materials may be suitable for use in the construction of the present invention with no limitation in the teachings therein.

Therefore, the term "carpet covering" as defined herein is to be interpreted broadly to include the above-mentioned materials and any material generally known in the art as suitable for and promoting cat scratching post functionality.

Form Factor Not Limitive

Figure 6:
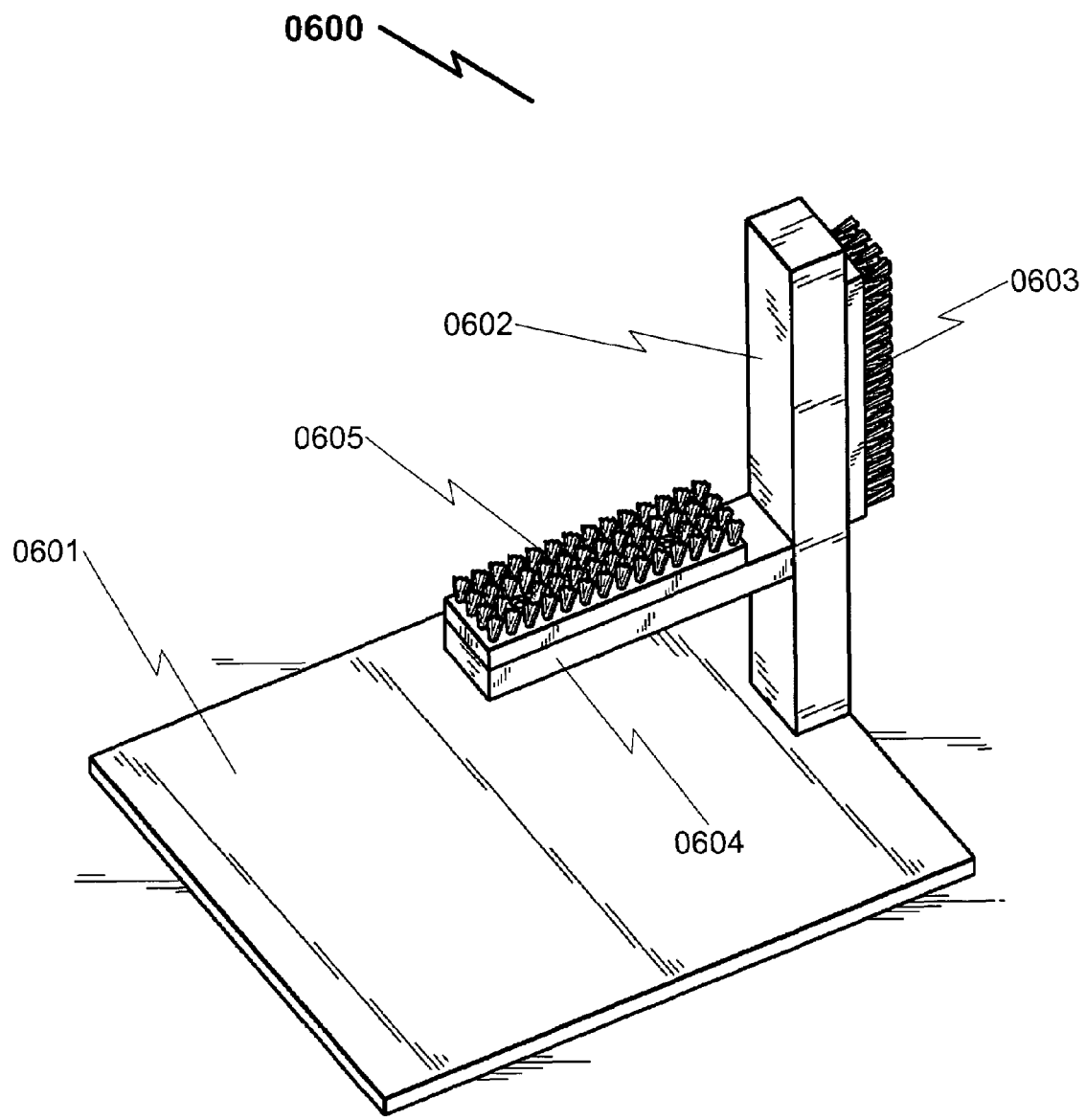
FIG. 6 and FIG. 17 illustrate perspective views of a presently preferred exemplary embodiment of the present invention.
Figure 7:
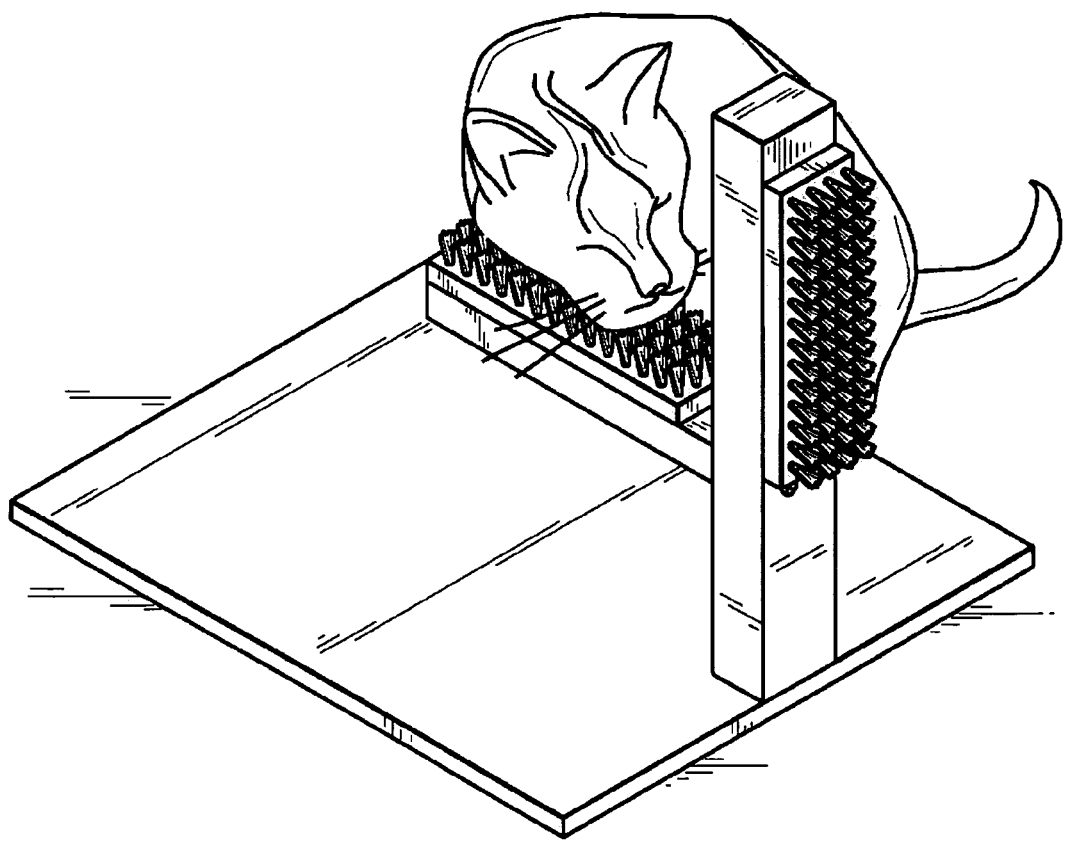
FIG. 7 illustrates a perspective view of a presently preferred exemplary embodiment of the present invention illustrating pet grooming using the horizontal grooming brush.
Figure 8:
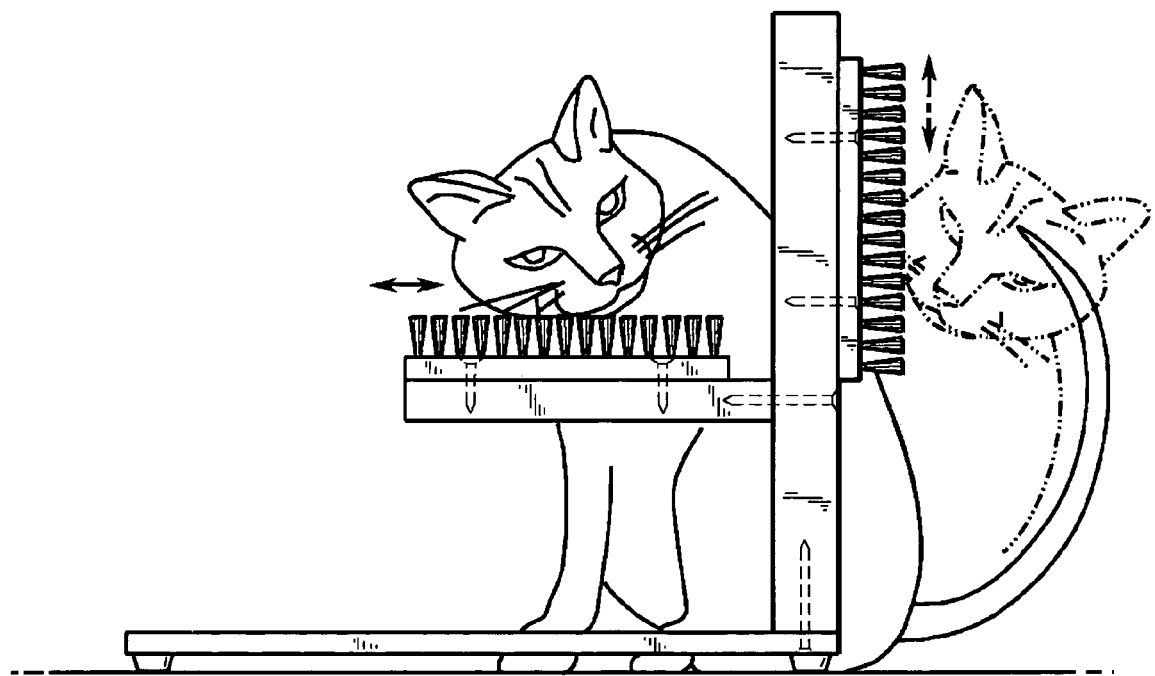
FIG. 8 illustrates a perspective view of a presently preferred exemplary embodiment of the present invention illustrating pet grooming using the horizontal and vertical grooming brushes.
Figure 13:
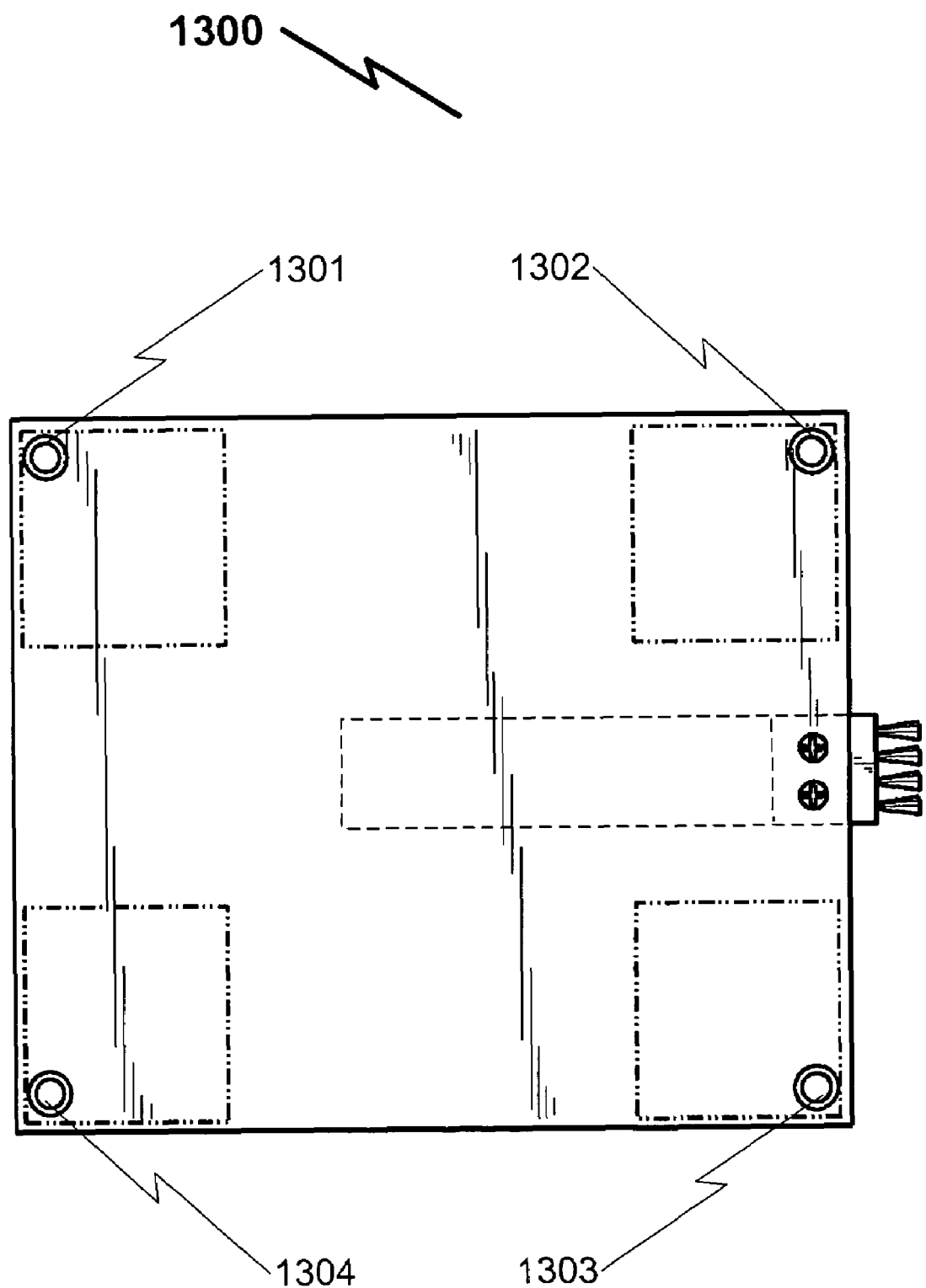
FIG. 13 illustrates a bottom view of a presently preferred exemplary embodiment of the present invention.

The present invention may be generally applied to many construction variations. The exemplary preferred embodiment structure generally detailed in FIG. 6 (0600) may have a wide variety of variations, including but not limited to the following:

- The substantially flat platform (0601) may have a wide variety of configurations and is not limited to rectangular/square configurations;
- The substantially flat platform (0601) may optionally incorporate rubber feet (1301, 1302, 1303, 1304) or other supporting mechanisms as generally illustrated in FIG. 13 (1300);
- The system may incorporate one (or more) vertical supporting members (0602) and each vertical supporting member may incorporate zero, one (or more) vertical grooming brushes (0603);
- Each vertical supporting member (0602) may incorporate zero, one (or more) horizontal supporting members (0604), and each horizontal supporting member (0604) may incorporate zero, one (or more) horizontal grooming brushes (0605);
- The brushes generally illustrated in FIG. 6 (0603, 0605), may in some circumstances be replaced with or supplemented by combs of various configurations (having metal or plastic comb tongs) with no loss in invention functionality or scope of teaching;
- While the exemplary preferred embodiment illustrated in FIG. 6 (0600) incorporates rectangular supporting members (0602, 0604) and rectangular grooming brushes (0603, 0605), other forms for each of these structural elements are possible and anticipated by the present invention, including but not limited to tubular/cylindrical form factors and fanciful or artistic forms that have decorative appeal. One skilled in the art will no doubt determine a number of other possibilities given the teachings of the present invention.
- While FIG. 6 (0600) illustrates an exemplary construction detail of some exemplary preferred embodiments of the present invention, the device may also be designed such that the brushes are field-replaceable by a like brush or other implement with no loss in invention functionality or scope of teaching;
- Post (0901) and brush (0912) as shown in FIG. 9 (0900) may be angled arbitrarily away from a perfectly perpendicular orientation relative to base (0902) and/or they may be rotated about the substantially vertical axis in order to differently facilitate animal grooming use of the device with no loss in invention functionality or scope of teaching;
- Arm (0909) and brush (0915) as shown in FIG. 9 (0900) may be mounted at an arbitrary angle relative to the horizontal plane defined by base (0902) and/or they may be rotated about the substantially horizontal axis in order to differently facilitate animal grooming use of the device with no loss in invention functionality or scope of teaching;
- While FIG. 9 (0900) illustrates an exemplary construction detail of some exemplary preferred embodiments of the present invention, one skilled in the art will recognize that other construction techniques are equally applicable, including but not limited to routed-and-glued routed and/or dovetail joints and the like;
- One skilled in the art will recognize from the views detailed in FIG. 6 (0600) and the exemplary assembly view of FIG. 9 (0900) that it is possible in some circumstances to integrate the functionality of the vertical supporting member (0602) and the vertical grooming brush (0603) and similarly that the horizontal supporting member (0604) and the horizontal grooming brush (0605) may be similarly integrated into unitary components with no loss of overall system functionality or teaching.
- One skilled in the art will recognize from the views detailed in FIG. 6 (0600) and the exemplary assembly view of FIG. 9 (0900) that it is possible in some circumstances to integrate the functionality of the vertical supporting member (0602), the vertical grooming brush (0603), and the horizontal supporting member (0604), the horizontal grooming brush (0605), and the base (0601) into a unitary component with no loss of overall system functionality or teaching.

One skilled in the art will recognize that that a wide variety of other form factors are possible which perform the same function as taught by the present invention.

Exemplary System (0600,0700,0800,0900,1000, 1100,1200,1300)

As illustrated generally in FIGS. 6-13 (0600,0700,0800, 0900,1000,1100,1200,1300), the present invention may be implemented utilizing the following components:

- A substantially planar base;
- A substantially vertical post;
- A substantially horizontal arm;
- One or more grooming brushes;
- Screws;
- Optional wood stain and/or varnish finishing; and
- Optional rubber feet supports.

The following sections discuss this system in more detail.

Exemplary Detailed Description

It will be appreciated that the several drawings representing the invention are not intended to be in scale. It will further be appreciated that most animals, especially those which are essentially fully or partially covered with hair or fur, groom and/or scratch themselves. The present invention takes advantage of this characteristic in animals and provides a self-grooming device for animal use. Although not limited to home use, the present animal self-grooming device finds great utility when used in the home and is available for use by cats and/or dogs, normally retained in the home environment as pets, for example. Certainly the present self-grooming device may be used in other environments, such as kennels, dog-houses, barns and other places where animals are kept.

It will be appreciated that the animal grooming device of the present invention may be made in different sizes depending upon the size of the animal for whose use the grooming device is intended.

With the above in mind, attention is now directed to FIGS. 6-13 (0600,0700,0800,0900,1000,1100,1200,1300) which show representations of a preferred embodiment from various perspectives. As shown in the preferred exemplary assembly view of FIG. 9 (0900), this preferred exemplary invention embodiment includes an elongated post (0901) having two threaded holes in the lower end thereof. The assembly also includes a planar base (0902), which has two threaded holes (0903) and (0904) to which the post (0901) is aligned. Screws (0905) and (0906) attach base (0902) and post (0901) via threaded holes (0903) and (0904).

Post (0901) further has two threaded holes (0907) and (0908) parallel to the plane of base (0902). Another elongated post or horizontal arm (0909) having two threaded holes in one end thereof mates perpendicularly to vertical post (0901). Screws (0910) and (0911) attach the vertical post (0901) and horizontal arm (0909) via threaded holes (0907) and (0908) and screws (0910) and (0911).

Narrow and elongated brush (0912) is then attached to post (0901) with its bristles facing outward from base (0902) using screws (0913) and (0914), where the length and spatial positioning of this brush (0912) are designed to address a wide range of animal heights for the target user's species.

Similarly, the length and rigidity of the bristles on brush (0912) are designed to the animal's coat characteristics such that the animal may brush itself all the way to its skin if it so chooses. This is important in removing thick undercoat fur that is frequently shed but also frequently trapped. Note too that post (0901) and brush (0912) may be individually angled arbitrarily away from a perfectly perpendicular orientation relative to base (0902) and they may be rotated in order to differently facilitate animal grooming use of the device.

Brush (0915) is attached to horizontal arm (0909) using screws (0916) and (0917) with its bristles pointing away from base (0902). The dimensions and spatial positioning of this brush (0915) are designed to address a wide range of the target species' animal population with the application being primarily grooming of the pet's face, chin, neck and teeth.

The bristles of brush (0915) are designed to allow maximal grooming of the animal's head region. Note also that arm (0909) and brush (0915) may be individually mounted at an arbitrary angle relative to the horizontal plane defined by base (0902) and they may also be rotated in order to differently facilitate animal grooming use of the device.

It has been determined that the bristles of brushes (0912) and (0915) have similar preferred embodiments. Natural Palmyra bristles of approximately 1 inch in length and 1/32 inch in diameter are non-toxic, have proper rigidity and resilience, possess good grooming capabilities, have excellent capacity for retaining materials released during grooming, are easy to clean, and they are sufficiently rugged to survive at least several years of frequent use.

Brushes (0912) and (0915) were optimized to 2 inch by 7 inch dimensions for use with pet cats, and they each employ four evenly spaced columns of 13 palmyra bristle clusters, where each cluster contains approximately 50 bristles.

For shipping purposes, the base (0902) is typically not attached to the upper assembly. This is accomplished by removing, or not installing, screws (0905) and (0906). It will be observed that the dismantled assembly may be compactly and densely packaged for efficient shipping and display purposes, while maintaining the ability for very simple and rapid assembly.

Alternate Embodiment Vertical Support Construction (1400)

Figure 14:
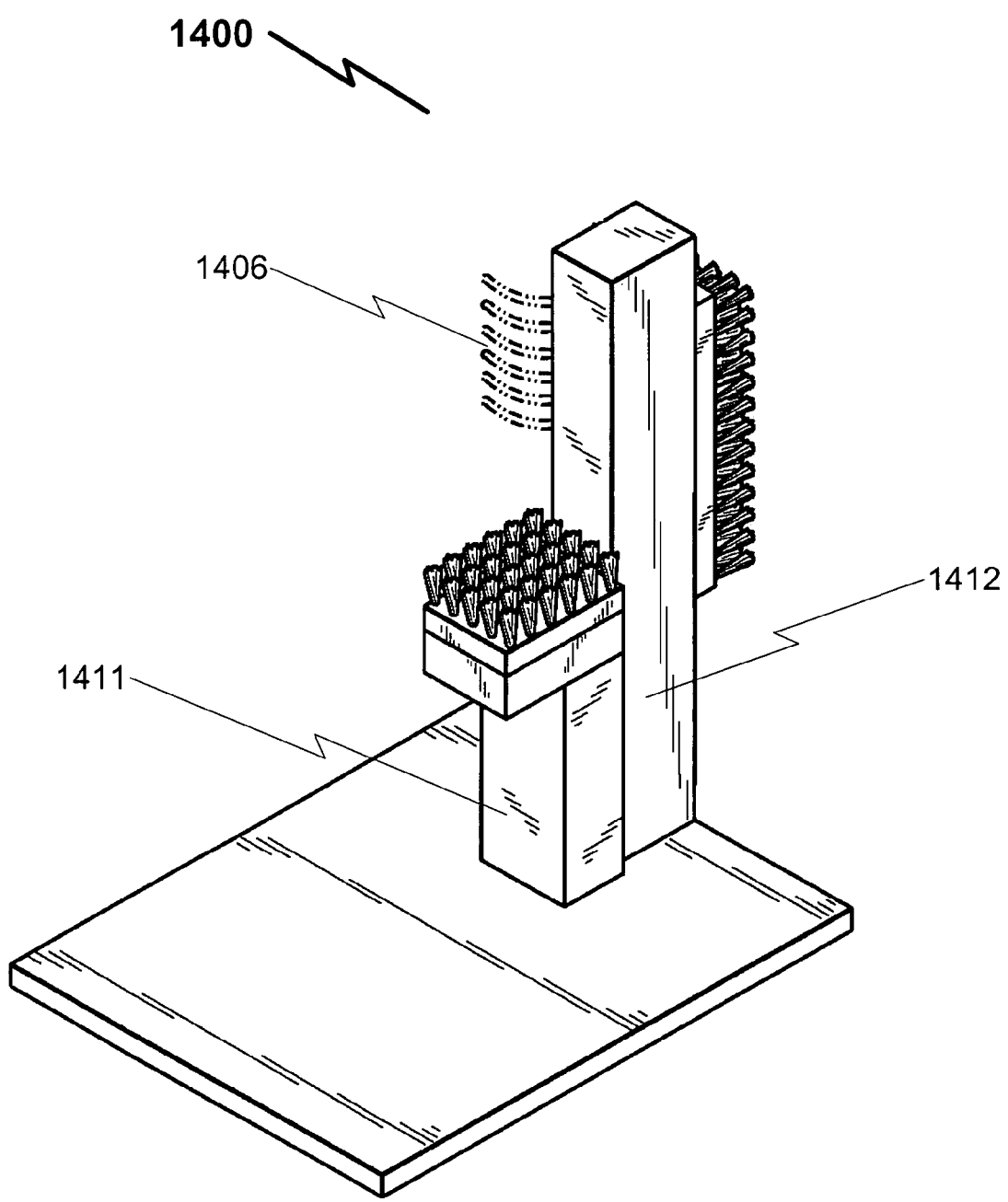
FIG. 14 illustrates a perspective view of a presently preferred alternate exemplary embodiment of the present invention.

The present invention may alternatively be implemented using a configuration similar to that illustrated in FIG. 14 (1400), wherein the vertical supporting member is constructed of multiple pieces (1411, 1412) (such as traditional 2×4 construction material or the like). In this and other configurations, the vertical supporting member may also incorporate additional animal grooming devices, such as metal or plastic combs and the like, which are generally illustrated as item (1406).

Alternate Embodiment Fabrication (1500)

Figure 15:
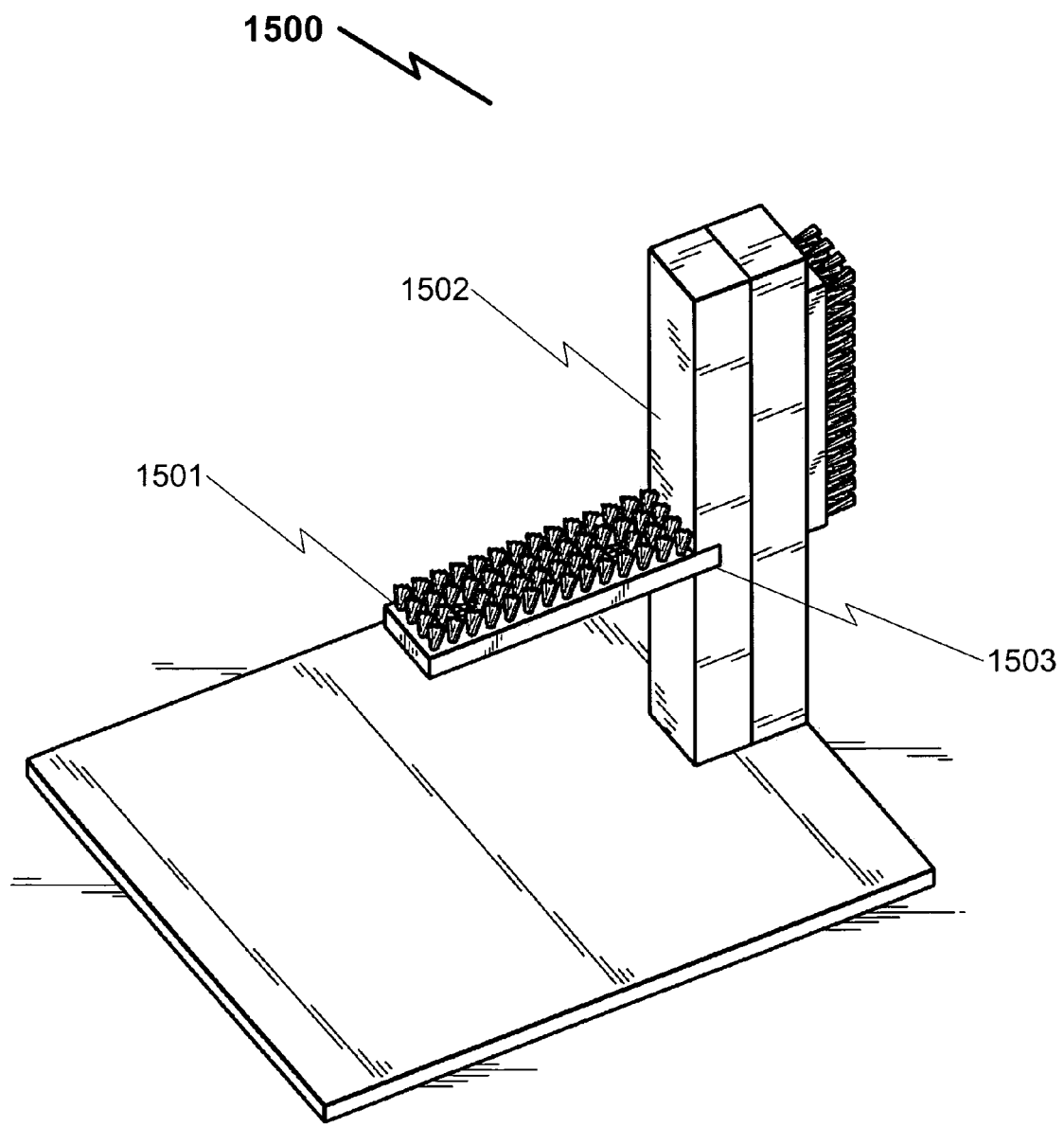
FIG. 15 illustrates a perspective view of a presently preferred exemplary embodiment of the present invention illustrating an alternate construction methodology.

The present invention may be fabricated and formed using conventional screws or the like as illustrated in the general assembly view of FIG. 9 (0900). However, the present invention anticipates alternative construction techniques such as that illustrated in FIG. 15 (1500), wherein the horizontal brush and horizontal support member may be combined into a single functional element (1501) and mated to the vertical support member (1502) by means of a routed-and-glued joint (1503) which may in some circumstances be a dovetail joint or the like.

One skilled in the art will undoubtedly realize that many variations in attachment technology are possible without departing from the spirit and teaching of the present invention.

Alternate Embodiment Incorporating Scratching Post (1600)

The present invention may be augmented as illustrated in FIG. 16 (1600) wherein the baseplate platform, vertical, and/or horizontal supporting members further comprise carpeting (1601), or are covered with other material for the purposes of integrating a cat scratching post within the framework of the disclosed invention. This configuration is especially useful in situations where the cat or other animal is located in a space-confined area such as an apartment, small room, or cage where space is at a premium. In these circumstances the integration of the cat scratching post and the disclosed grooming device solves many of the deficiencies in the prior art and permits efficient use of pet habitat area.

Animal Training

Finally, an animal may be easily and quickly trained to enjoy the present invention by applying an attracting agent (such as catnip) directly to the grooming bristles. Catnip is particularly effective with cats, for example, and U.S. Pat. Nos. 4,807,569 and 4,926,796 are designed with a sealable compartment for catnip plant-matter. Catnip oil is available from herbal suppliers, and catnip spray is available from pet stores. The present invention recognizes that these liquid forms of catnip are more easily employed by the pet owner in training, that they are typically more potent or effective, and that they do not complicate design by requiring a separate compartment for training aid materials when compared to the use of catnip in plant material form.

System Variations

Although several embodiments of the invention have been shown and described and some modifications have been suggested, other changes and modifications as will become apparent to those skilled in the art may be made without departing from the spirit of the invention.

CONCLUSION

An animal self-grooming system incorporating a platform supporting horizontally and vertically oriented brushes or combs which is usable by an animal without human intervention has been disclosed. The brushes or combs are positioned such that they support walk-by and stationary self-grooming respectively as well as massage. An animal attraction substance may be applied to the brushes or combs for animal self-grooming training. A material that promotes claw exercise may optionally be applied to the vertical and/or horizontal structural components of the disclosed device to incorporate a "scratching post" appliance within the animal self-grooming system context.

What is claimed is:

1. An animal grooming system comprising:
   (a) A substantially flat platform;
   (b) A vertical supporting member attached within ±45 degrees of perpendicular to said platform;
   (c) A horizontal supporting member attached within ±45 degrees of perpendicular to said vertical supporting member;
   (d) A vertical grooming brush attached to said vertical supporting member; and
   (e) A horizontal grooming brush attached to said horizontal supporting member; wherein
   said vertical grooming brush is attached substantially parallel to said vertical supporting member and is attached on the opposite side of said vertical supporting member from the attachment point of said horizontal supporting member to said vertical supporting member; and
   said horizontal grooming brush is attached to said horizontal supporting member with the brush fibers of said horizontal grooming brush upwardly facing, and wherein said horizontal supporting member further comprises a carpet covering.

2. The animal self-grooming system of claim 1 wherein said vertical grooming brush and said horizontal grooming brush are coated with catnip.

3. The animal self-grooming system of claim 1 wherein said substantially flat platform, said vertical supporting member, and said horizontal supporting member comprise wood.

4. The animal self-grooming system of claim 1 further comprising multiple horizontal grooming brushes attached substantially perpendicular to said vertical supporting member.

5. The animal self-grooming system of claim 1 further comprising multiple vertical grooming brushes attached substantially parallel to said vertical supporting member.

6. The animal self-grooming system of claim 1 wherein said platform further comprises a carpet covering.

7. The animal self-grooming system of claim 1 wherein said vertical grooming brush further comprises a comb.

8. The animal self-grooming system of claim 1 wherein said horizontal grooming brush further comprises a comb.

9. The animal self-grooming system of claim 1 wherein said platform further comprises rubber feet supports.

10. An animal grooming system comprising:
    (a) A substantially flat platform;
    (b) A vertical supporting member attached within ±45 degrees of perpendicular to said platform;
    (c) A horizontal supporting member attached within ±45 degrees of perpendicular to said vertical supporting member;
    (d) A vertical grooming brush attached to said vertical supporting member; and
    (e) A horizontal grooming brush attached to said horizontal supporting member; wherein
    said vertical grooming brush is attached substantially parallel to said vertical supporting member and is attached on the opposite side of said vertical supporting member from the attachment point of said horizontal supporting member to said vertical supporting member; and
    said horizontal grooming brush is attached to said horizontal supporting member with the brush fibers of said horizontal grooming brush upwardly facing, and
    wherein said vertical supporting member further comprises a carpet covering.

11. An animal grooming system comprising:
    (a) A substantially flat platform;
    (b) A vertical supporting member attached within ±45 degrees of perpendicular to said platform;
    (c) A horizontal supporting member attached within ±45 degrees of perpendicular to said vertical supporting member;
    (d) A vertical grooming brush attached to said vertical supporting member; and
    (e) A horizontal grooming brush attached to said horizontal supporting member; wherein
    said vertical grooming brush is attached substantially parallel to said vertical supporting member and is attached on the opposite side of said vertical supporting member from the attachment point of said horizontal supporting member to said vertical supporting member; and
    said horizontal grooming brush is attached to said horizontal supporting member with the brush fibers of said horizontal grooming brush upwardly facing, and wherein said substantially flat platform, said vertical supporting member, and said horizontal supporting member are integrally formed into a unitary plastic structure.

* * * * *